United States Patent Office.

HENRY WILLOUGHBY, OF KEARNEY, NEW JERSEY.

SOLDERING COMPOSITION.

SPECIFICATION forming part of Letters Patent No. 514,107, dated February 6, 1894.

Application filed October 31, 1893. Serial No. 489,672. (No specimens.)

*To all whom it may concern:*

Be it known that I, HENRY WILLOUGHBY, a citizen of the United States, residing at Kearney, in the county of Hudson and State of New Jersey, have invented a certain new and useful Composition of Matter for Soldering; and I do hereby declare the following to be a full, clear, and exact description of the invention, such as will enable others skilled in the art to which it appertains to make and use the same.

My composition consists of the following ingredients, combined substantially in the proportions stated, viz:—colophony, one part in weight; gypsum, four parts in weight; stearin, four parts in weight. These ingredients are melted, stirred and well mixed in a suitable vessel for about two hours, while hot. They are then allowed to cool off, when the mass becomes a paste and is then thoroughly kneaded and pounded by means of suitable hammers or mallets, thereby hardening the mass, which is then formed into rolls or cakes of a size convenient to handle by a workman when soldering and may then be put up in boxes or packages for transportation and use.

The compound is used like a piece of chalk, *i. e.* drawn with a gentle pressure along the edges of the seams to be soldered, after which the solder is applied in the usual manner, thereby dispensing with the use of rosin, borax, acids, sal ammoniac, grease, &c., and leaving a clean, bright surface on the solder, so that the smallest hole can be detected at a glance; moreover no scraping of the soldered material is needed before painting, as has been the case heretofore, as there will nothing be left requiring to be scraped off.

The composition may be employed in soldering iron, copper, brass and zinc and is absolutely harmless to either; besides it will not soil the hands or clothing and can be used in wind or rain and being of a greasy nature turns the rain.

Having thus described my invention, what I claim, and desire to secure by Letters Patent, is—

The herein-described composition of matter to be used in soldering metals, consisting of colophony, gypsum and stearin, in the proportions substantially as specified.

In testimony that I claim the foregoing I have hereunto set my hand this 21st day of October, 1893.

HENRY WILLOUGHBY.

Witnesses:
OLIVER DRAKE,
ROBERT SOLLBERGER.